US012427780B2

(12) United States Patent
Vazquez Fernandez et al.

(10) Patent No.: US 12,427,780 B2
(45) Date of Patent: Sep. 30, 2025

(54) FLUID DELIVERY SYSTEM WITH PUMP SERVICING FEATURES

(71) Applicant: Hewlett-Packard Development Company, L.P., Spring, TX (US)

(72) Inventors: Dorkaitz Alain Vazquez Fernandez, Sant Cugat del Valles (ES); Alvin Zheng-Hui Yu, San Diego, CA (US); Joan-Albert Miravet Jimenez, Sant Cugat del Valles (ES); Albert Crespi Serrano, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 210 days.

(21) Appl. No.: 18/006,084

(22) PCT Filed: Jul. 20, 2020

(86) PCT No.: PCT/US2020/042796

§ 371 (c)(1),
(2) Date: Jan. 19, 2023

(87) PCT Pub. No.: WO2022/019883

PCT Pub. Date: Jan. 27, 2022

(65) Prior Publication Data

US 2023/0286285 A1 Sep. 14, 2023

(51) Int. Cl.
*B41J 2/175* (2006.01)
*B41J 2/17* (2006.01)

(52) U.S. Cl.
CPC ......... *B41J 2/17596* (2013.01); *B41J 2/1707* (2013.01)

(58) Field of Classification Search
CPC . B41J 2/17; B41J 2/175; B41J 2/17596; B41J 2/1707
See application file for complete search history.

(56) References Cited

U.S. PATENT DOCUMENTS

| | | | | |
|---|---|---|---|---|
| 4,827,280 | A | 5/1989 | Stamer et al. | |
| 5,592,201 | A * | 1/1997 | Lim | B41J 2/16526 347/92 |
| 5,980,034 | A | 11/1999 | Tsai et al. | |
| 6,179,406 | B1 * | 1/2001 | Ito | B41J 2/17596 347/35 |
| 7,717,540 | B1 * | 5/2010 | King | B41J 2/165 347/85 |
| 8,360,561 | B2 | 1/2013 | Livshitz et al. | |
| 8,727,513 | B2 | 5/2014 | Bachar et al. | |
| 8,746,860 | B2 | 6/2014 | Delueg | |
| 8,960,868 | B1 | 2/2015 | Turgeman | |
| 2007/0097186 | A1 | 5/2007 | Lewey et al. | |

(Continued)

FOREIGN PATENT DOCUMENTS

WO 2012/054017 A1 4/2012

*Primary Examiner* — Douglas X Rodriguez
*Assistant Examiner* — Kendrick X Liu
(74) *Attorney, Agent, or Firm* — Jordan IP Law, LLC

(57) ABSTRACT

A printing fluid delivery system comprising a fluid pump having an inlet and an outlet, a valve connected to the outlet of the fluid pump, and a controller to close the valve while the fluid pump is driven to increase the pressure at the outlet of the fluid pump based on a service condition and to open the valve based on a predefined relief condition to relieve the pressure at the outlet of the fluid pump.

16 Claims, 9 Drawing Sheets

(56) References Cited

U.S. PATENT DOCUMENTS

| | | | | |
|---|---|---|---|---|
| 2017/0313095 | A1* | 11/2017 | Bayona | B41J 2/17596 |
| 2018/0244067 | A1 | 8/2018 | Suzuki | |
| 2020/0108628 | A1* | 4/2020 | Ezumi | B41J 2/18 |

* cited by examiner

FLUID DELIVERY SYSTEM WITH PUMP SERVICING FEATURES

BACKGROUND

Printers can be used to generate predefined structures on a print medium by depositing a printing fluid, such as an ink, on a substrate. The geometry of the structure can be defined by a relative movement between a printhead ejecting the printing fluid and a substrate holder.

To print on the substrate, the printing fluid is guided from a printing fluid supply through a printing fluid delivery system to the printhead. The printing fluid is then controllably ejected when the position of the printhead coincides with an element of the predefined structure.

BRIEF DESCRIPTION OF THE DRAWINGS

The following detailed description will best be understood with reference to the drawings, wherein.

DETAILED DESCRIPTION

Figure 1A:
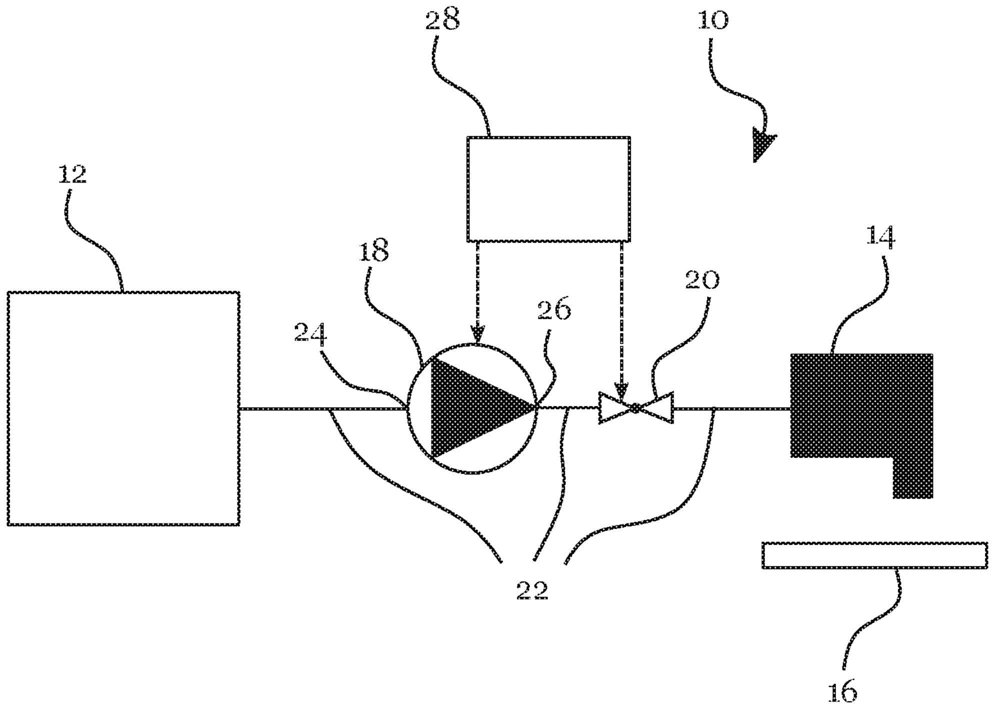
FIGS. 1A, 1B illustrate a printing fluid delivery system according to an example.

FIG. 1A illustrates an example of a schematic printing fluid delivery system 10 connecting a printing fluid supply 12 to a printhead 14 to deposit a printing fluid on a substrate 16. The printing fluid delivery system 10 comprises a fluid pump 18 and a valve 20 connected by a plurality of printing fluid conduits 22. In the illustrated example, an inlet 24 of the fluid pump 18 is connected to the printing fluid supply 12 to transfer the printing fluid from the printing fluid supply 12 towards the printhead 14. The valve 20 is arranged between an outlet 26 of the fluid pump 18 and the printhead 14 to control a flow of the printing fluid from the outlet 26 of the fluid pump 18 towards the printhead 14.

Figure 1B:
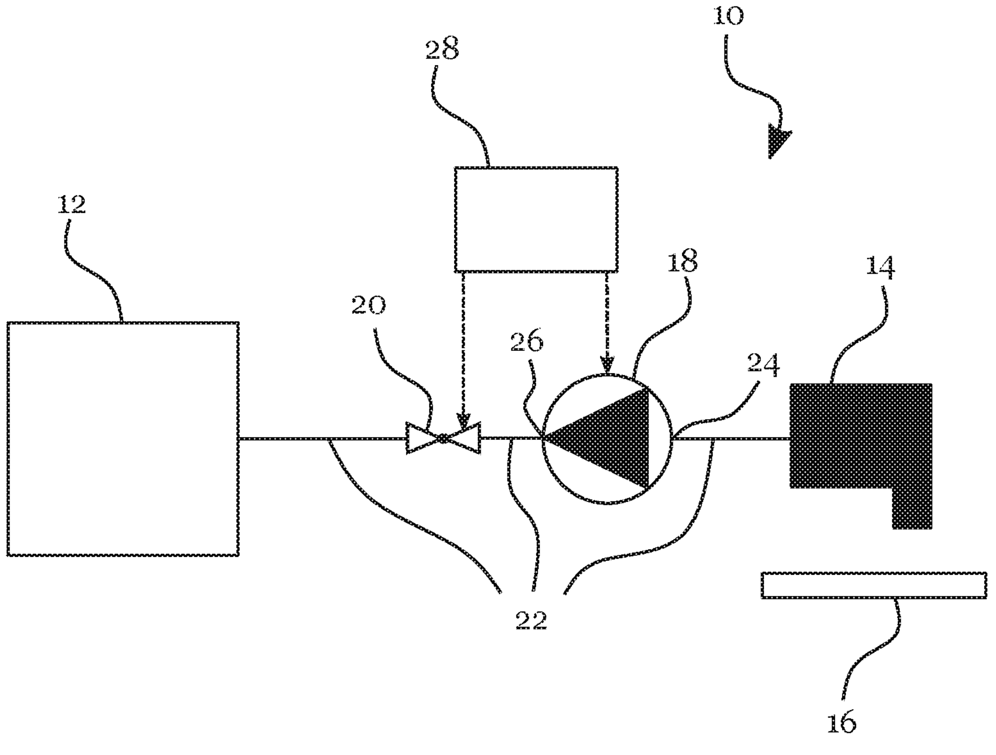

As illustrated in FIG. 1B, the inlet 24 of a fluid pump 18 may also be connected to the printhead 14 in a printing fluid delivery system 10, while the outlet 26 of the fluid pump 18 may face the printing fluid supply 12 in order to generate a flow from the printhead 14 towards the printing fluid supply 12, wherein the flow may be controlled by a valve 20 arranged between the outlet 26 of the fluid pump 18 and the printing fluid supply 12. Other portions (not shown) of the fluid delivery system 10 may provide printing fluid to the print head 14.

Independently of the arrangement of the fluid pump 18 and the valve 20 in FIGS. 1A and 1B, a controller 28 may control a state of the fluid pump 18 or the valve 20 via a control pathway (indicated in FIG. 1 by dashed lines), such as to control opening or closing of the valve 20 or to selectively drive the fluid pump 18. The controller 28 may be implemented in hardware, in software as part of machine-readable instructions, or in a combination thereof, and may be part of the printing fluid delivery system 10 or an associated printer. The controller 28 may also be part of an external system, e.g. an external controller 28 connected to the printing fluid delivery system 10 via a suitable communication pathway, and may send control commands to the valve 20 or the fluid pump 18 via the communication pathway in order to control a flow of the printing fluid in the printing fluid delivery system 10.

The printing fluid for printing on the substrate 16 may be any appropriate material suitable to generate a printed image or shaped element on the substrate, such as a colored ink, a liquid build material, or a combination thereof. The printed image and/or shaped element may be or comprise text, lines, shapes, letters, numerals, signs, symbols or a combination of these in an arbitrary color, alignment or shape. In some examples, the printing fluid may be layered onto the substrate 16 in order to build a three-dimensional shape using the printing fluid. The printhead 14 or the substrate 16 can be supported by a displacement assembly allowing the relative displacement of the printhead 14 and the substrate 16 along linear or complex paths to control a deposition process of the printing fluid in order to generate arbitrary shapes or images on the substrate 16.

The printing fluid may be stored or buffered in the printing fluid supply 12 outside of or during a printing operation of the printhead 14. The printing fluid supply 12 may be an internal tank 12 of the printing fluid delivery system 10 or may be an external printing fluid supply 12, such as an exchangeable printing fluid cartridge connectable to the printing fluid delivery system 10.

The fluid pump 18 may transfer the printing fluid between the printing fluid supply 12 and the printhead 14 and may be implemented as any fluid pump 18 suitable to generate a pressure difference between the inlet 24 of the fluid pump 18 and the outlet 26 of the fluid pump 18, such as a positive displacement pump. In some examples, the fluid pump 18 is a one-directional fluid pump, such as a reciprocating positive displacement pump, e.g. a piston pump, plunger pump, diaphragm pump, or the like. The pressure difference generated between the inlet 24 and the outlet 26 of the fluid pump 18 may cause a flow of the printing fluid through the fluid pump 18, such as to move the printing fluid from the inlet 24 to the outlet 26 of the fluid pump 18 and through the printing fluid delivery system 10.

However, the printing fluid may contain flow impeding constituents, e.g. partially dried printing fluid particles or other solid particles introduced into the printing fluid, in the following referred to as dry particles. The dry particles may be introduced into the printing fluid delivery system 10 via an external supply 12 of the printing fluid or may be created within the printing fluid delivery system 10, such as by intermittent exposure of the conduits 22 to air and subsequent drying of printing fluid within the printing fluid delivery system 10.

The dry particles may settle in the fluid pump 18, the valve 22, or the conduits 22 of the printing fluid delivery system 10 and may interfere with normal operation of the fluid delivery system 10. For example, the dry particles may impede the flow of the printing fluid through the printing fluid delivery system 10 by clogging a conduit 22 or may interfere with the operation of the fluid pump 18 or the valve 20. In particular, a dry particle may settle in a valve element of the fluid pump 18 which may result in a reduced flow rate in the fluid delivery system 10 or a reduced pressure difference across the fluid pump 18.

The presence of impeding dry particles in the printing fluid delivery system 10 or an increased probability thereof may define a service condition of the printing fluid delivery system 10 or the fluid pump 18. The service condition may be a recurring condition or a dynamically triggered condition. For example, the likelihood of dry particles in the fluid delivery system 10 may be increased based on a regularly occurring event, such as the exchange of a printing fluid supply 12 connected to the printing fluid delivery system 10 or a transfer of the printing fluid from a first printing fluid supply 12 to a second printing fluid supply 12 connected to the printing fluid delivery system 10. Hence, the service condition may be triggered based on an elapsed time or the occurrence of a service event in the printing fluid delivery system 10, such as the exchange of a printing fluid cartridge. However, the service condition may also be triggered based on an observable state of the fluid delivery system 10, such as based on a flow rate through the fluid delivery system 10, based on the value of a pressure level attained in a certain state of the fluid delivery system 10, or based on a power consumption of the fluid pump 18.

When a service condition of the printing fluid delivery system 10 pertaining to a dry particle is met, the controller 28 may conduct a service procedure to remove the dry particle in the printing fluid delivery system 10.

Figure 2:
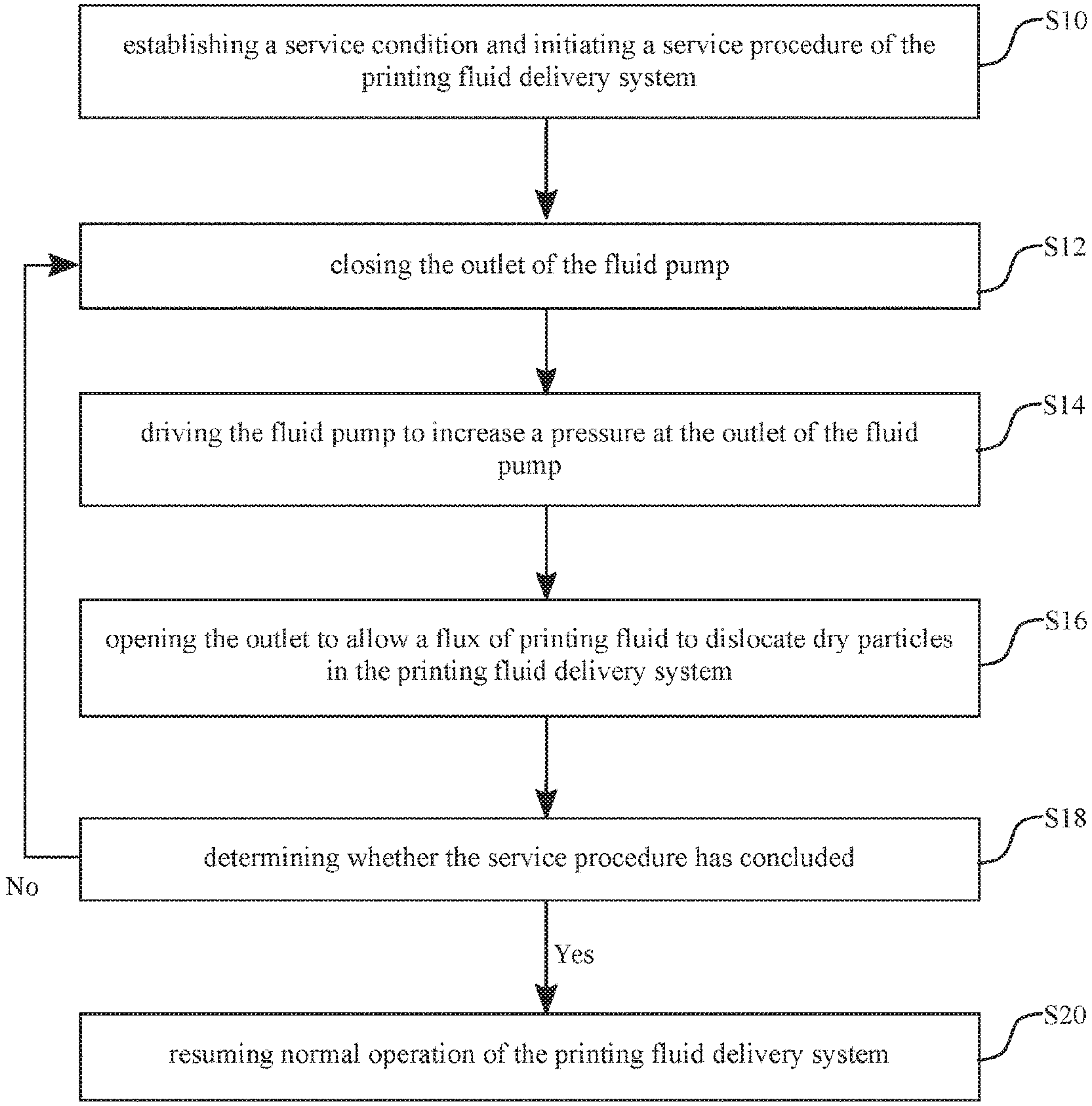
FIG. 2 illustrates a flowchart of a service procedure in a printing fluid delivery system according to an example.

FIG. 2 illustrates flow chart for a method to service a printing fluid delivery system 10 according to an example. The method comprises establishing a service condition and initiating a service procedure of the printing fluid delivery system 10 (S10). The method may then initiate the service procedure by closing the outlet 26 of the fluid pump 10, e.g. by closing a valve 20 in the printing fluid delivery system 10 (S12), and by driving the fluid pump 18 to increase a pressure at the outlet 26 of the fluid pump 18. The method may further include opening the outlet 26 to allow a flux of the printing fluid to dislocate dry particles in the printing fluid delivery system 10 (S16) and determining whether the service procedure has concluded (S18). If the service procedure has concluded, normal operation of the printing fluid delivery system 10 may be resumed (S20). Otherwise, the method may again close the outlet 26 of the fluid pump 18 and drive the fluid pump 18 to increase the pressure at the outlet 26 of the fluid pump 18. In some examples, the method further comprises stopping the fluid pump 18 before opening outlet 26 of the fluid pump 18.

The service procedure may conclude by detecting that an impediment in the printing fluid delivery system 10 has been removed. In some examples, the service procedure comprises multiple cycles, e.g. opening and closing the valve 20 facing the outlet 26 of the fluid pump 18 in an alternating manner while the fluid pump 18 is driven for a predefined number of cycles, and the service procedure concludes when the predefined number of cycles of the service procedure have been performed.

In the examples of FIGS. 1A and 1B, the controller 28 may perform a service procedure by closing the valve 20 while the fluid pump 18 is driven to increase the pressure at the outlet 26 of the fluid pump 18. The controller 28 may then open the valve 20 based on a predefined relief condition to relieve the pressure at the outlet 26 of the fluid pump 18.

The increased pressure at the outlet 26 may strain the dry particle or the pump elements of the fluid pump 18 through an increased pressure difference between the outlet 26 and the inlet 24 of the fluid pump 18 to dislodge the dry particle in the fluid pump 18, the valve 20 or a conduit 22. Based on the predefined relief condition, the valve 20 may be opened to flush the fluid pump 18 and the valve 20 with the printing fluid and to remove the dry particle.

In some examples, the predefined relief condition includes an elapsed time of driving the fluid pump 18 or includes meeting a pressure threshold at the outlet 26 of the fluid pump 18. The elapsed time may be a predefined time associated with the service procedure, such as 10 seconds or 30 seconds, or may be an average time to reach a target pressure difference across the fluid pump 18. The pressure at the outlet 26 of the fluid pump 18 may also be measured during said service procedure, such as to open the valve 20 when a predefined pressure threshold is met.

In some examples, the fluid delivery system 10 comprises a sensor (not shown in FIG. 1A or 1B) to monitor an operating condition of the fluid pump 18 or the printing fluid delivery system 10, and the controller 28 closes the valve 20 when the operating condition deviates from a target condition by a pre-defined deviation.

Hence, the service condition may be dynamically triggered based on the operating condition of the fluid pump 18 by the controller 28 in order to perform the service procedure when an impediment has been detected. Further, the service procedure may be repeated by the controller 28 until the operating condition no longer deviates from the target condition by the predefined deviation.

As an example, the operating condition may be a flow rate induced by the fluid pump 18, the pressure generated by the fluid pump 18 at the outlet 26 or at the inlet 24 of the fluid pump 18, or the power consumption of the fluid pump 18. When a settled dry particle impedes the functionality of a valve element of the fluid pump 18, a pumping efficiency of the fluid pump 18 may be reduced due to an increased backflow through said valve element. The impediment due to the presence of the dry particle fluid pump 18 may be detected based on a reduced flow rate in the printing fluid delivery system 10, a reduced pressure difference across the fluid pump 18 when the fluid pump 18 is driven, or a reduced power consumption of the fluid pump 18.

The target condition may accordingly be a target value of the flow rate, a target pressure difference across the fluid pump 18, or a target power consumption of the fluid pump 18 in a reference state of operation and in the absence of dry particles. The predefined deviation may be a deviation associated with the presence of dry particles in the fluid pump 18 or the printing fluid delivery system 10 in reference measurements, such as a deviation of 4% or 10% from the target condition.

However, the controller 28 may also close the valve 20 and drive the fluid pump 18 to increase the pressure at the outlet 26 of the fluid pump 18 based on an elapsed time since the last service condition or based on a change of an printing fluid supply 12.

In other words, the service procedure may also be a regularly performed service procedure to preemptively service the printing fluid delivery system 10 or the fluid pump 18, such as to proactively prevent accumulation of dry particles in the printing fluid delivery system 10 or the fluid pump 18.

Figure 3:
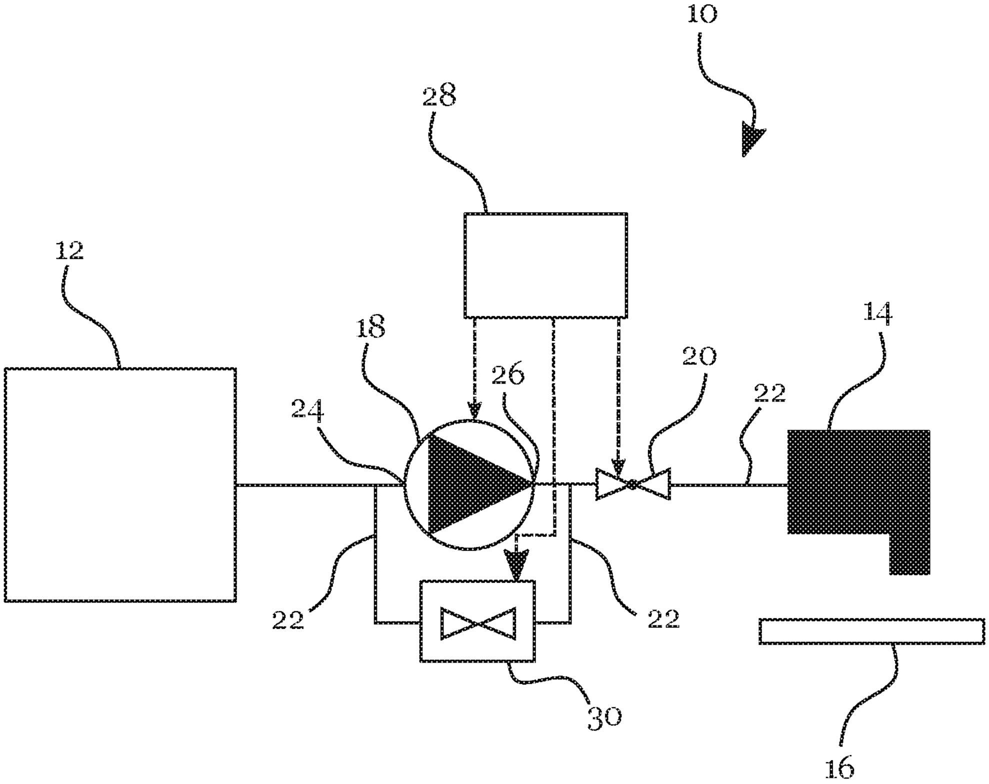
FIG. 3 illustrates a printing fluid delivery system according to another example.

FIG. 3 illustrates another example of a schematic printing fluid delivery system 10 connecting a printing fluid supply 12 to a printhead 14 to deposit a printing fluid on a substrate 16. The printing fluid delivery system 10 comprises a fluid pump 18 and a valve 20 connected to the printing fluid supply 12 and the printhead 14 via conduits 22. In addition, the printing fluid delivery system 10 comprises a bypass conduit 30, the bypass conduit 30 selectively connecting the outlet 26 and the inlet 24 of the fluid pump 18. A controller 28 may control a state of the fluid pump 18, the valve 20, or the bypass conduit 30 via a control pathway (indicated in FIG. 3 by dashed lines), such as to control opening or closing of the valve 20, to selectively drive the fluid pump 18, or to selectively connect the outlet 26 and the inlet 24 via the bypass conduit 30.

When the service condition is met, the controller 28 may close the valve 20 and drive the fluid pump 18 to increase a pressure at the outlet 26 of the fluid pump 18. When the pressure at the outlet 26 of the fluid pump 18 is greater than a pre-defined pressure threshold, the controller 28 may selectively connect the outlet 26 of the fluid pump 18 to the inlet 24 of the fluid pump 18 through the bypass conduit 30, such that the printing fluid flows from the outlet 26 to the inlet 24 of the fluid pump 18 through the bypass conduit 30.

Hence, the fluid pump 18 may be flushed at a predefined pressure at the outlet 26 or at a pre-defined pressure difference between the inlet 24 and the outlet 26 of the fluid pump 18, such as to dislodge a dry particle in the fluid pump 18 or the bypass conduit 30. The controller 28 may measure the pressure at the outlet 26 of the fluid pump 18 to selectively connect the inlet 24 and the outlet 26 of the fluid pump 18 by opening a valve in the bypass conduit 30.

The bypass conduit 30 may also comprise an automatic valve which may not be directly controlled by the controller 28 but which opens automatically when a pressure difference between the inlet 24 and the outlet 26 of the fluid pump 18 is greater than the pre-defined pressure threshold.

In some examples, the bypass conduit 30 comprises a pressure relief valve associated with the pre-defined pressure threshold and connecting the outlet 26 and the inlet 24 of the fluid pump 18, such that the printing fluid flows from the outlet 26 to the inlet 24 of the fluid pump 18 through the pressure relief valve when the valve 20 is closed and the pressure difference between the outlet 26 and the inlet 24 is greater than the pre-defined pressure threshold.

The pressure relief valve may be arranged in a separate conduit 22 or may be integrated into the fluid pump 18 to form the bypass conduit 30 in the fluid pump 18. Closing the valve 20 facing the outlet 26 of the fluid pump 18 may then effectively flush the fluid pump 18 at the pre-defined pressure difference through the pressure relief valve to remove dry particles in the fluid pump 18 or the pressure relief valve.

Figure 4A:
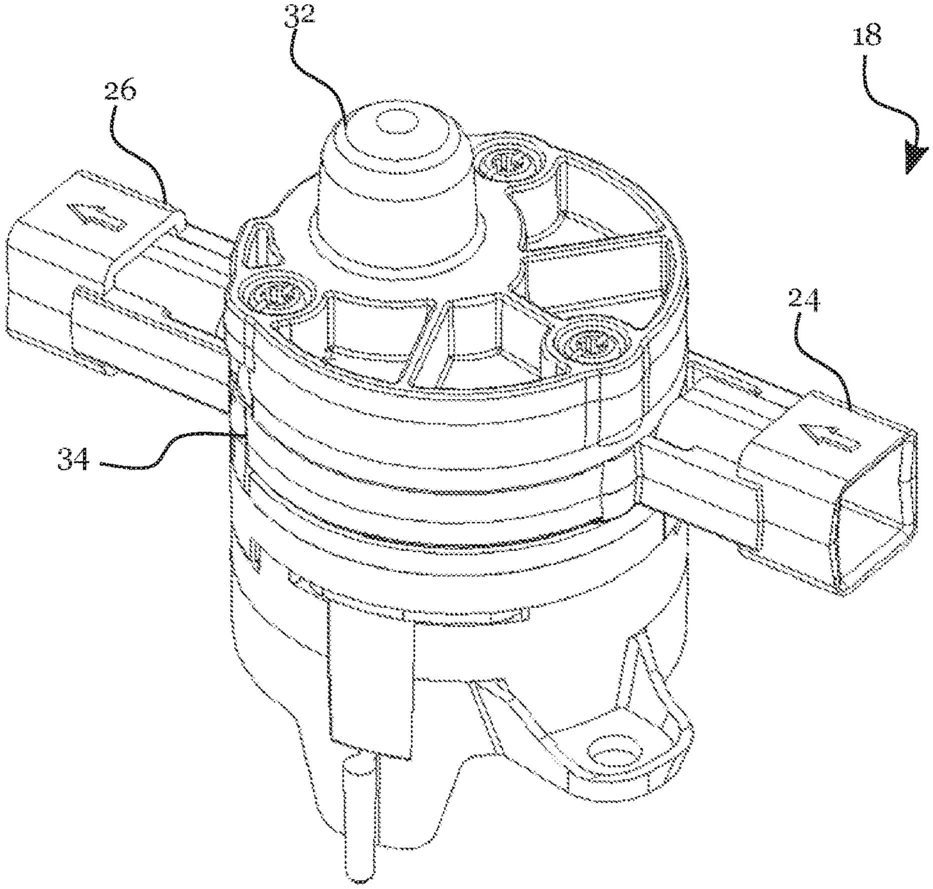
FIGS. 4A, 4B illustrate a fluid pump for a printing fluid delivery system according to an example.
Figure 4B:
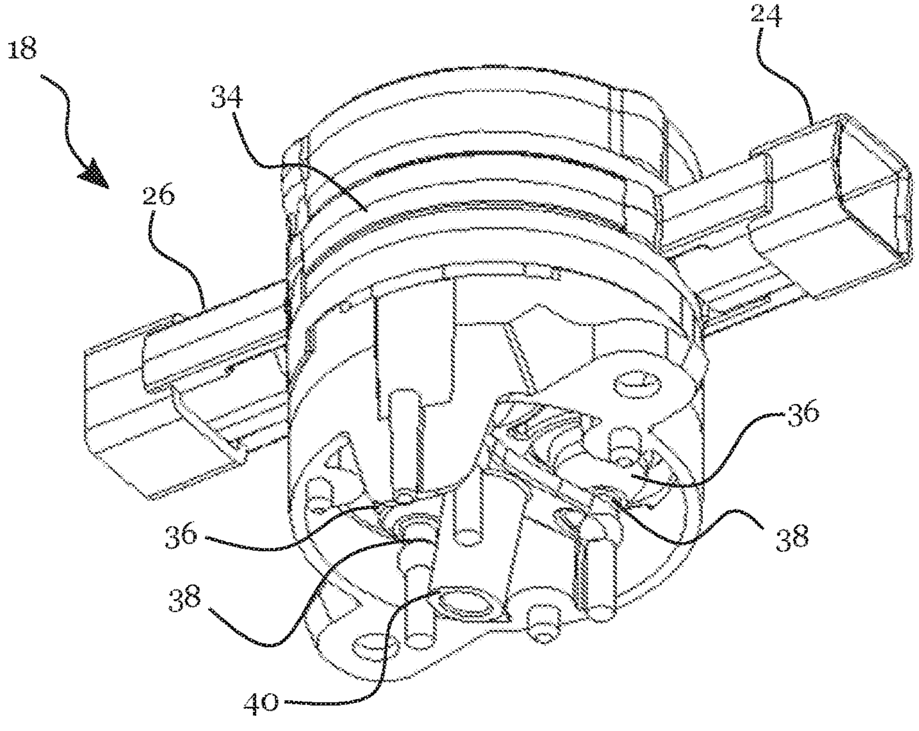

FIGS. 4A and 4B illustrate an example of a fluid pump 18 with an integrated pressure relief valve 32 according to a top and bottom view, respectively. The fluid pump 18 comprises an inlet 24 and an outlet 26 each connected to an interconnection plate 34 of the fluid pump 18. The pressure relief valve 32 is arranged at a top side of the fluid pump 18 and integrated with the fluid pump 18 to connect the inlet 24 and the outlet 26 of the fluid pump 18 when a pressure difference is above a relief threshold of the pressure relief valve 32. The fluid pump 18 further comprises three pump chambers 36 each associated with a piston 38. The pistons 38 are connected to an actuator 40 to drive the fluid pump 18.

In operation, the actuator 40 may be displaced by a motor (not shown) to induce a revolving motion of the actuator 40 which successively displaces the pistons 38 in a reciprocating manner. The pistons 38 drive a reciprocating motion of a movable wall element of the associated pump chamber 36 in order to dynamically change the volume of the pump chamber 36. The pump chambers 36 are connected to the inlet 24 and the outlet 26 of the fluid pump 18 with respective one-directional valves (not shown in FIGS. 4A and 4B, but shown in FIGS. 5A and 5B), such that the change of the volume of the pump chambers 36 leads to a pumping of the printing fluid from the inlet 24 to the outlet 26 of the fluid pump 18.

Figure 5A:
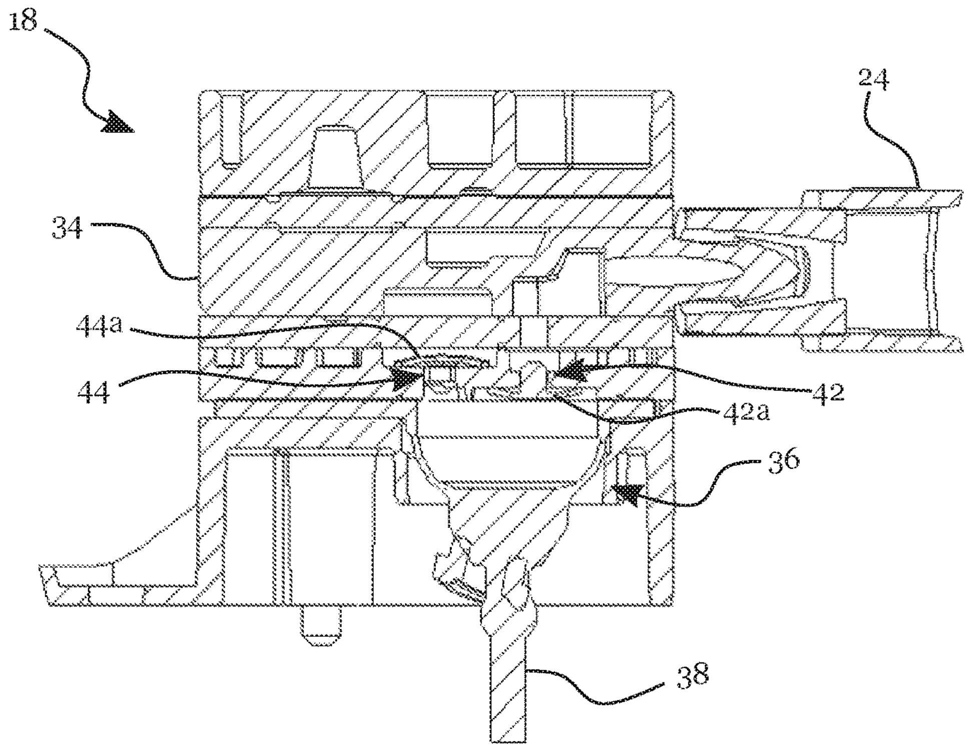
FIG. 5A illustrates a sectional view of a fluid pump according to an example.
Figure 5B:
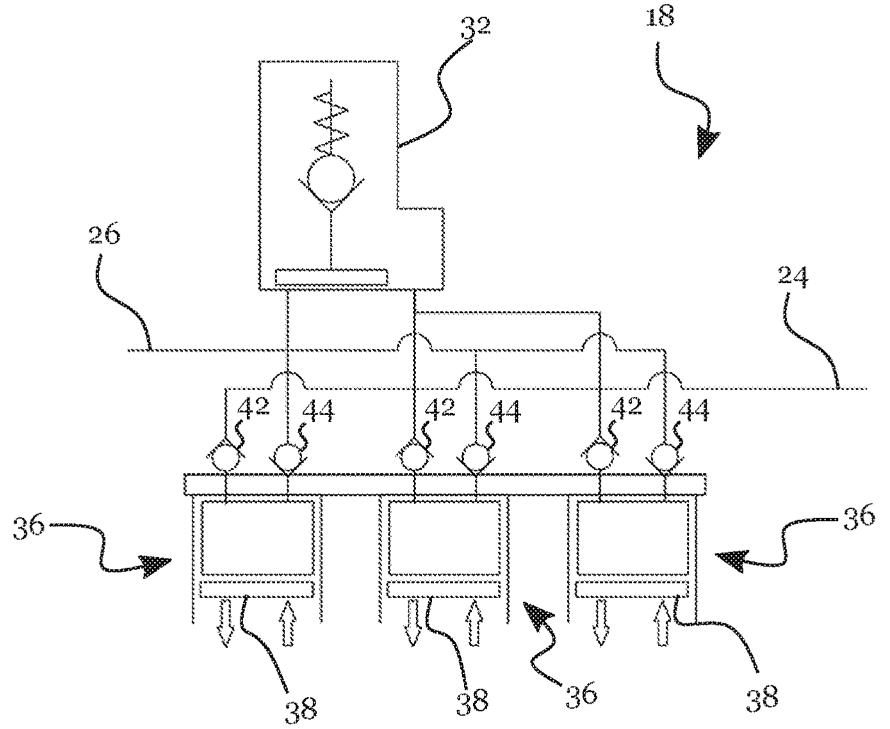
FIG. 5B shows a schematic of a fluid pump according to an example.

FIGS. 5A and 5B illustrate sectional and schematic views of the example of a fluid pump 18 shown in FIGS. 4A and 4B.

FIG. 5A illustrates a sectional view through a pump chamber 36 and the inlet 24 of the fluid pump 18. The pump chamber 36 is connected to the interconnection plate 34 via an inlet one-directional valve 42 and an outlet one-directional valve 44, which are implemented as umbrella shaped valves 42, 44. The umbrella shaped valves 42, 44 are arranged next to an orifice of the pump chamber 36 and comprise a capping portion 42*a*, 44*a* overlaying the orifice. The umbrella shaped valves 42, 44 may be movable with respect to the orifice or may comprise a flexible portion, such that at least a portion of the capping portion 42*a*, 44*a* may move with respect to the orifice depending on a fluid pressure. Hence, the umbrella shaped valves 42, 44 may prevent a flow of the printing fluid in one direction and may admit the flow of the printing fluid through the orifice in the opposite direction.

The umbrella shaped valves 42, 44 are arranged with respect to the pump chamber 36, such that the inlet one-directional valve 42 admits an influx of the printing fluid from the inlet 24 into the pump chamber 36, when a pressure in the pump chamber 36 is lower than a pressure at the inlet 24 of the fluid pump 18 and such that the outlet one-directional valve 44 allows the printing fluid to exit the pump chamber 36 when the pressure in the pump chamber 36 is higher than the pressure at the outlet 26 of the fluid pump 18. By driving the piston 38 in a reciprocating manner, the volume of the pump chamber 36 may be changed dynamically to alternatingly increase and decrease the pressure in the pump chamber 36 and to generate a flow from the inlet 24 to the outlet 26 of the fluid pump 18.

During operation of the fluid pump 18, a dry particle may settle near an orifice of the pump chamber 36 and may impair the operation of the one-directional valves 42, 44. For example, the dry particle may settle beneath the capping portion 42*a*, 44*a* of an umbrella shaped valve 42, 44 to prevent a closing of the one-directional valve 42, 44. When the dry particle prevents closing of the one-directional valves 42, 44 in the fluid pump 18, a pumping action of the fluid pump 18 may be counteracted by a backflow through the one-directional valve 42, 44. The flow of the printing fluid from the inlet 24 to the outlet 26 of the fluid pump 18 may then be reduced which may constitute a service condition of the fluid pump 18.

Figure 6:
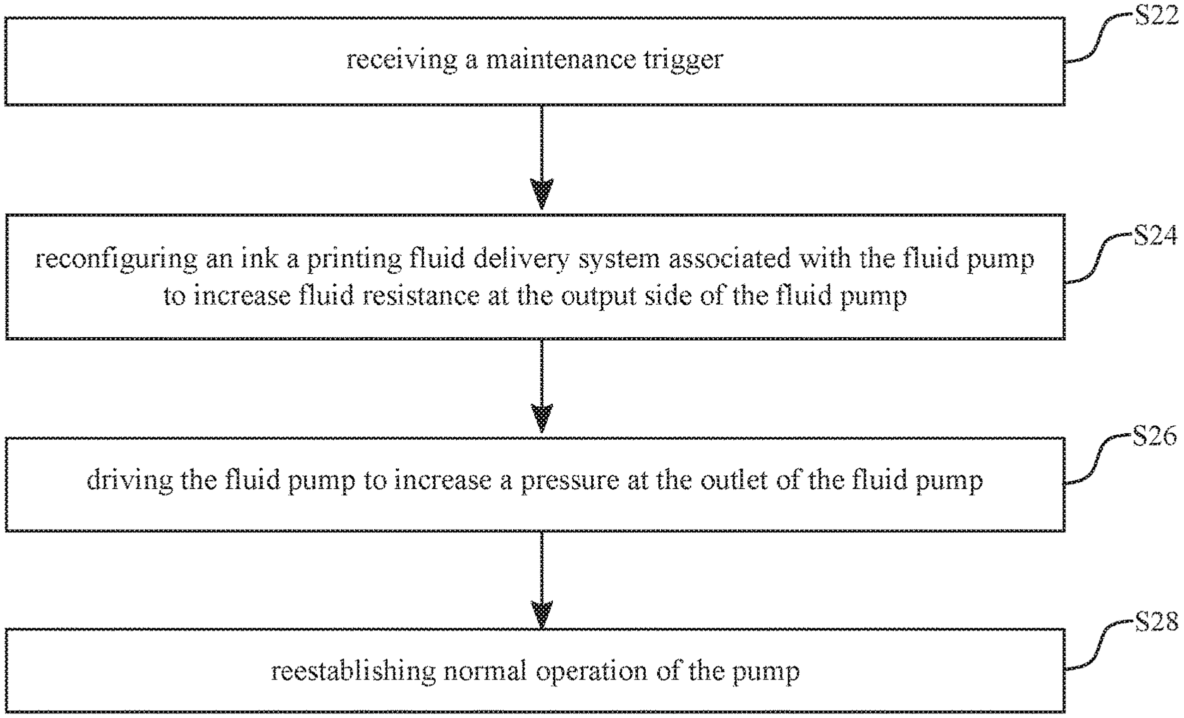
FIG. 6 shows a flowchart for a method of servicing a fluid pump according to an example.

FIG. 6 illustrates a flow chart of a method for servicing the fluid pump 18 in response to the service condition according to another example. The method comprises receiving a maintenance trigger (S22), which may be associated with the detection of the service condition or may be set off based on a recurring service condition. The method may then reconfigure a printing fluid delivery system 10 associated with the fluid pump 18 to increase fluid resistance at the output side of the fluid pump (S24), and driving the fluid pump 18 to increase a pressure at the outlet 26 of the fluid pump 18 (S26).

The fluid resistance may be increased by redirecting a flow from the outlet 26 through a different conduit 22 or by closing a valve 20 associated with or facing the outlet 26 of the fluid pump 18. Due to the increased fluid resistance at the output side of the fluid pump 18, the dry particle impeding the functionality of the fluid pump 18 may be subjected to an increased pressure difference or to an alternating flow of the printing fluid, such as to dislodge the dry particle within the fluid pump 18. When the outlet 26 and the inlet 24 of the fluid pump 18 are connected by a pressure relief valve 32, the increased pressure at the output side of the fluid pump 18 may overcome the predefined pressure threshold of the pressure relief valve 32, such as to recirculate printing fluid through the fluid pump 18 via the pressure relief valve 32 at a pressure difference defined by the pressure relief valve. Flushing the fluid pump 18 via the pressure relief vale 32 in such a manner may dislodge dry particles within the pressure relief valve 32 or trapped in a one-directional valve 42, 44 of the fluid pump 18.

After a certain time of driving the fluid pump 18 or when a removal of the dry particle is detected, the printing fluid delivery system 10 may be reconfigured to reestablish normal operation of the pump (S28), such as by opening the valve 20 or by opening a valve facing the input of the fluid pump 18. The efflux or influx of printing fluid may then dislodge or flush out the dry particle. In some examples, the fluid pump 18 is stopped prior to opening valves facing the inlet 24 or the outlet 26 of the fluid pump 18 and is restarted after the fluid pump 18 is flushed.

As illustrated in FIGS. 4A and 4B the fluid pump 18 may comprise a plurality of pump chambers 36 which may cooperate to transfer the printing fluid in the fluid delivery system 10 or to dislodge a dry particle during any of the aforementioned service procedures.

FIG. 5B illustrates a schematic diagram of a fluid pump 18 comprising three pump chambers 36 according to an example. Each pump chamber 36 is driven by a reciprocating piston 38 and is connected to the inlet 24 of the fluid pump 18 via an inlet one-directional valve 42 and is connected to the outlet 26 via an outlet one-directional valve 44. A pressure relief valve 32 connects the outlet 26 to the inlet 24 of the fluid pump 18 when a pressure difference between the outlet 26 and the inlet 24 is greater than a predefined pressure threshold.

During a service procedure each of the pump chambers 36 may increase a pressure difference between the outlet 26 and the inlet 24. When the pumping functionality of a first pump chamber 36 is impeded by a dry particle, the other pump chambers 36 may build up the pressure difference to dislodge the dry particle in the first pump chamber 36. In other words, the fluid pump 18 may comprise at least two pump chambers 36 and the at least two pump chambers 36 may cooperate to dislodge a dry particle in the fluid pump 18.

The service procedures may be applied to any one of the fluid pumps 18 in a printer while the service condition triggering the service procedure may be the same service condition or may be a different service condition for different fluid pumps 18 depending on the function and arrangement of the respective fluid pump 18 in the printing fluid delivery system 10.

Figure 7:
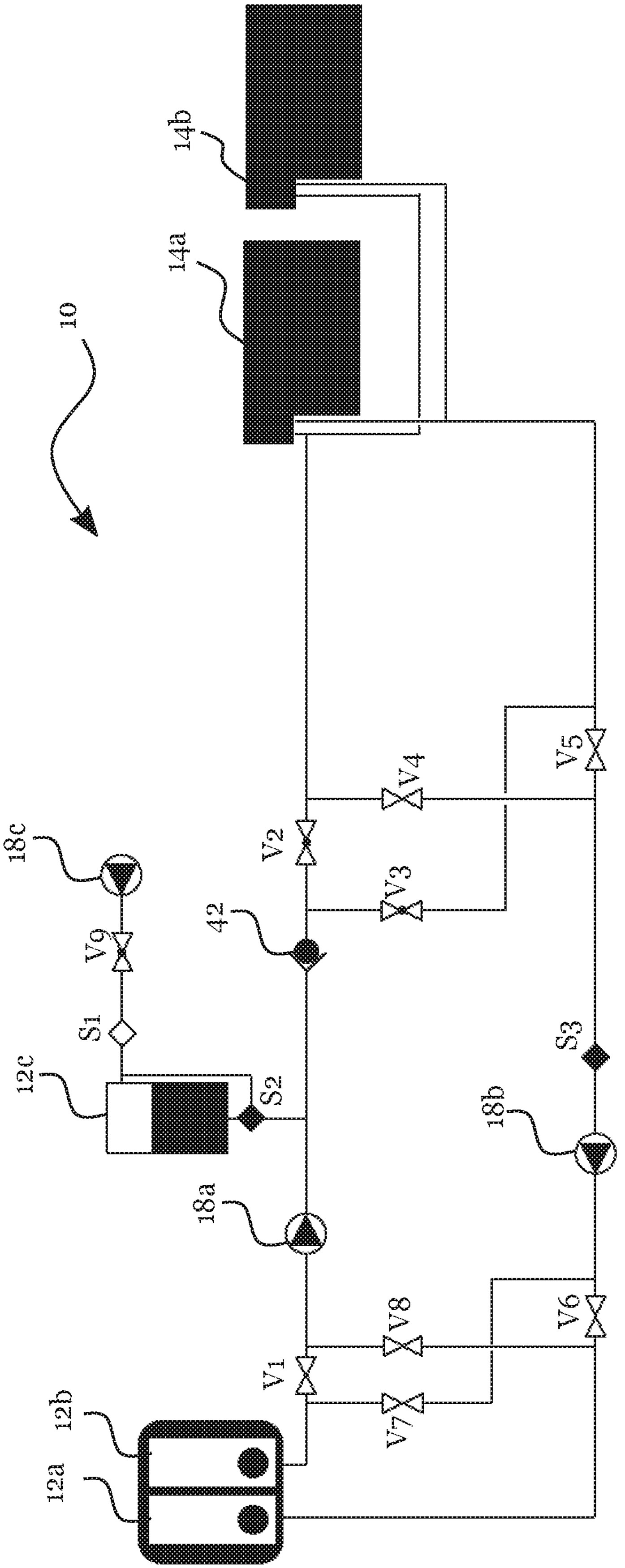
FIG. 7 illustrates a printing fluid delivery system in a printer according to an example.

FIG. 7 illustrates a schematic of a printing fluid delivery system 10 in a printer according to an example. The printing fluid delivery system 10 connects two printing fluid tanks 12*a*, 12*b* and two printheads 14*a*, 14*b* via a series of pumps 18*a*, 18*b*, valves V1-V9, and conduits 22 (illustrated by solid lines connecting the respective elements). An intermediate printing fluid tank 12*c* is arranged between the printing fluid tanks 12*a*, 12*b* and the printheads 14*a*, 14*b* to buffer the printing fluid in the printing fluid delivery system 10.

A first pump 18*a* pumps the printing fluid from the printing fluid tanks 12*a*, 12*b* to the intermediate printing fluid tank 12*c* or to the printheads 14*a*, 14*c*. A second pump 18*b* pumps the printing fluid from the intermediate tank 12*c* or from the printheads 14*a*, 14*b* to the printing fluid tanks 12*a*, 12*b* or from one of the printing fluid tanks 12*a*, 12*b* to the other printing fluid tank 12*a*, 12*b* depending on a valve configuration of valves V1-V8. A third fluid pump 18*c* controls a pressure of the intermediate tank 12*c* by pressuring the intermediate tank 12*c* with air while the pressure of the intermediate tank 12*c* is measured by sensor S1. Sensors S2, S3 measure a pressure of the printing fluid after the first fluid pump 18*a* and before the second fluid pump 18*b*, respectively. A controller 28 (not shown) may change the state of the valves V1-V9 to control the fluid connections in the printing fluid delivery system 10.

During printing, valves V2, V3 and V9 may be open while the other valves V1, V4-V8 may be closed, such that pressuring the intermediate tank 12*c* with the third pump 18*c* moves printing fluid from the intermediate tank 12*c* towards the printheads 14*a*, 14*b*. Based on a consumption of the printing fluid, valves V1 or V8 may be opened to move printing fluid from the printing fluid tanks 12*a*, 12*b* towards the intermediate tank 12*c* or towards the printheads 14*a*, 14*b* by driving the first pump 18*a*. When printing is stopped, the second pump 18*b* may move printing fluid to the tanks 12*a*, 12*b*. In addition, the second pump 18*b* may be driven to move printing fluid between the printing fluid tanks 12*a*, 12*b* as part of a regular exchange of printing fluid.

The controller 28 may perform a service procedure of the first pump 18*a* or the second pump 18*b* based on a service condition in order to remove dry particles from the fluid pumps 18*a*, 18*b*.

In some examples, the controller 28 performs a service procedure to remove dry particles from the second pump 18*b* as part of a regularly recurring service condition, such as the exchange of printing fluid between the first printing fluid tank 12*a* and the second printing fluid tank 12*b* to prevent an impediment of the second pump 18*b*.

The controller 28 may perform the service procedure on the other fluid pump 18*a* based on a dynamically determined service condition, such as based on sensor readings of the sensor S2, a measured flow rate, or a power consumption when the first pump 18*a* is driven.

The controller 28 may record determining that a functionality of the first pump 18*a* is impeded or may record performing the service procedure as a service record. Based on a frequency or total number of the service records for the first fluid pump 18*a*, a defect of the printing fluid delivery system 10 may be detected. In some examples, the service records are accessed by an external service controller to determine a defect of the printing fluid delivery system 10. In some examples, the controller 28 determines the defect of the printing fluid delivery system 10 and sends an alarm to the external service controller. The printer may then be serviced by a technician before an operator notices a degradation of performance.

In other words, when one of the fluid pumps 18*a*, 18*b* of a printer is subjected to a service procedure based on a recurring service condition, another pump 18*a*, 18*b* may be subjected to a service procedure based on a dynamically triggered service condition, such that a defect of the printer introducing an above average number of dry particles into the fluid delivery system 10 may be detected based on the service record of the other pump 18*a*, 18*b*.

The service procedures for the first fluid pump 18*a* or the second fluid pump 18*b* may be any of the aforementioned service procedures discussed in conjunction with the previous examples. In some examples, the opening state of the valves V1-V8 are reconfigured to effectively close an output side of the respective fluid pump 18*a* 18*b* undergoing the service procedure or to change a fluid resistance at the output side of the fluid pump 18*a*, 18*b*, while in some examples, the fluid pump 18*a*, 18*b* comprises an internal or additional outlet valve 20 to close an output side of the fluid pump 18*a*, 18*b* while the respective fluid pump 18*a*, 18*b* is driven.

Figure 8A:
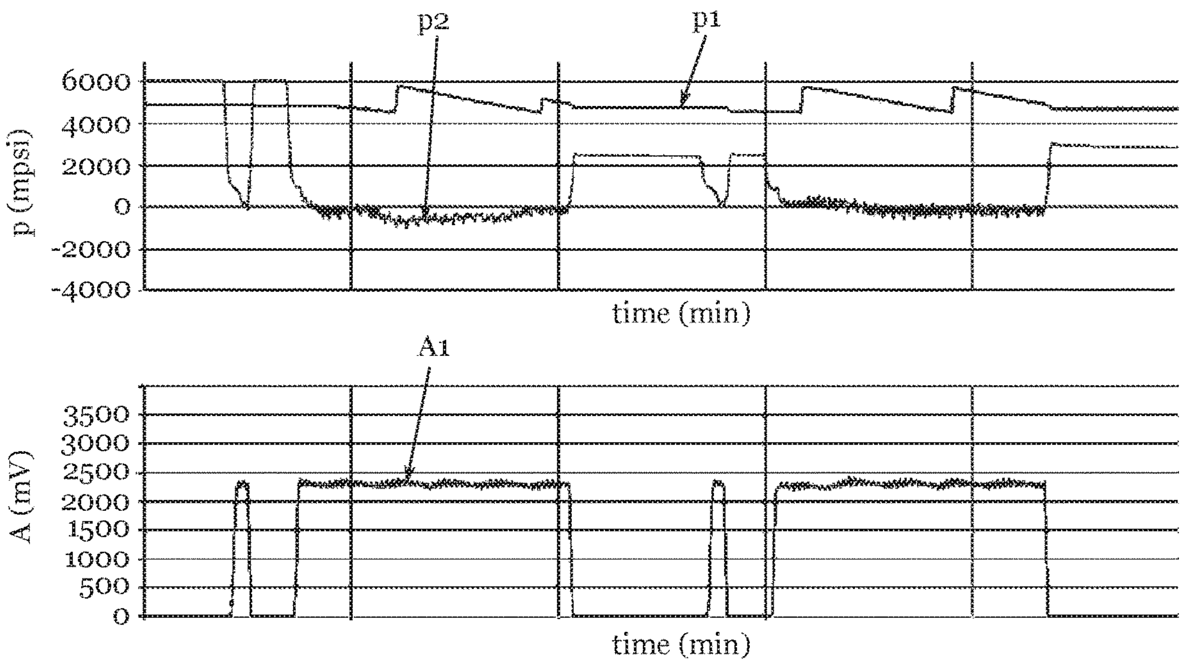
FIGS. 8A, 8B illustrate measurements of performance indicators before and after performing a service procedure in a printing fluid delivery system according to an example.
Figure 8B:
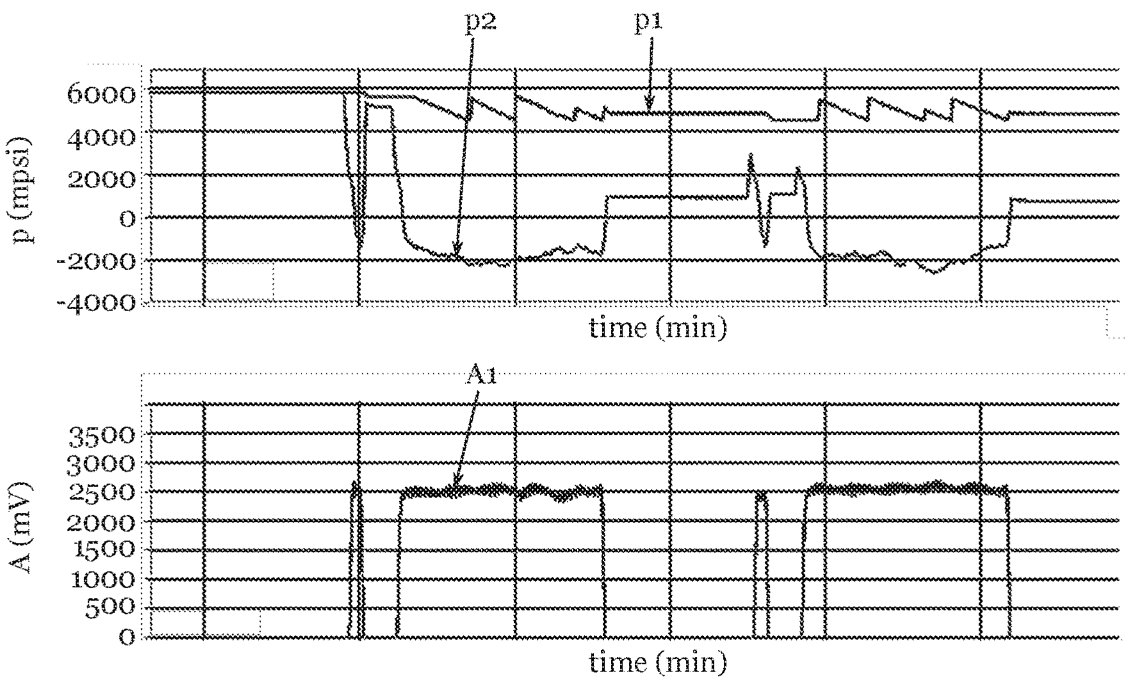

FIGS. 8A 8B illustrate graphs of performance indicators of in a printing fluid delivery system 10 corresponding to the example of FIG. 7 before and after the service procedure, respectively. Both figures illustrate the measured pressures p1, p2 measured at sensors S2 and S3, respectively, in units of mpsi (top graph), and the PWM amplitude of the second fluid pump's 18 motor in units of mV (bottom graph) as a function of time for corresponding time slots. Adjacent vertical lines in the graphs are separated by a time of 1 minute. In both figures, the controller 28 controls the third pump 18*c* and the valve V9 such that the pressure p1 of the intermediate tank 12*c* remains in a target interval between approximately 4500 and 5500 mpsi.

In FIG. 8A, a dry particle impedes a functionality of the second fluid pump 18*b* such that when the second fluid pump 18*b* is driven, the PWM amplitude of the second fluid pump's 18*b* motor is at a value of approximately 2400 mV while the pressure p2 reaches an average value of approximately −300 mpsi when the second pump 18*b* is driven. A flow rate through the second fluid pump 18*b* was measured at 11 g/min. Analysis of the second fluid pump 18*b* showed a dry particle impeding a functionality of a one-directional valve element 42, 44 of the second fluid pump 18*b*.

After the analysis, the second fluid pump 18*b* was driven while the output side was closed as part of a service procedure by closing the valves V6 and V7 for approximately 40 seconds before the pressure at the output side of the second fluid pump 18*b* was relieved. This cycle of a service procedure was repeated ten times.

FIG. 8B shows the same measurements as FIG. 8A in the same configuration of the printing fluid delivery system 10 but after the service procedure has concluded. The PWM amplitude of the second fluid pump's 18*b* motor has recovered to a value of approximately 2500 mV when the second fluid pump 18*b* is driven. The pressure p2 reaches an average value of approximately −1800 mpsi. The flow rate through the second fluid pump 18*b* has recovered to a higher value of 20 g/min as evidenced by the slope of the saw-shaped pressure profile of the intermediate tank p1 when the second pump 18*b* is driven. Hence, by performing the service procedure for 10 cycles, the dry particle was dislodged and the functionality of the second fluid pump 18*b* was restored.

Figure 9:
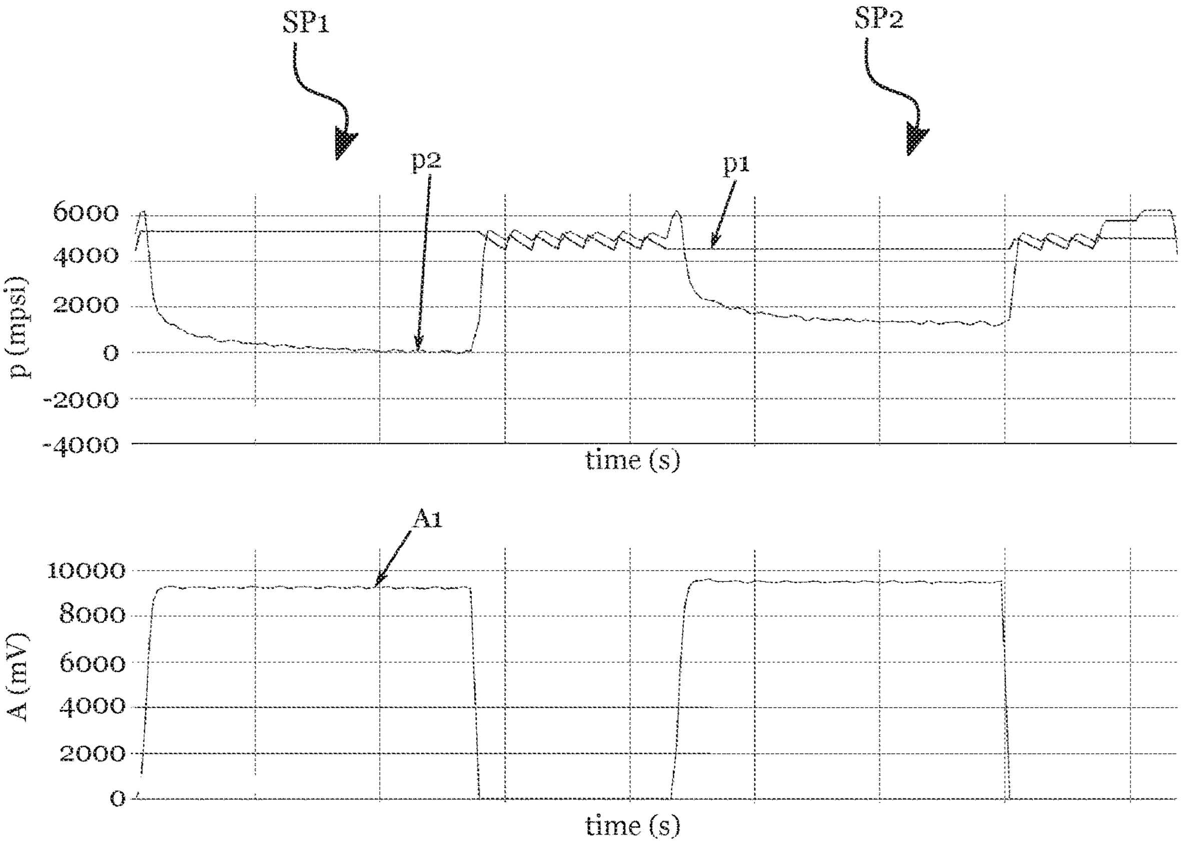
FIG. 9 illustrates measurements of performance indicators during a service procedure in a printing fluid delivery system according to an example.

FIG. 9 illustrates graphs of performance indicators in a printing fluid delivery system 10 corresponding to the example of FIG. 7, while two cycles SP1 and SP2 of a service procedure are being performed. The top graph shows the measured pressure values p1, p2 measured at sensors S2 and S3, respectively, in units of mpsi, and the bottom graph illustrates the PWM amplitude of the second fluid pump's 18 motor in units of mV as a function of time for corresponding time slots. Adjacent vertical lines are separated by a time of 15 seconds.

During the service procedure, the controller 28 controls the third pump 18*c* and the valve V9 such that the pressure p1 of the intermediate tank 12*c* remains in a target interval between approximately 4500 and 5500 mpsi. At the same time, the second fluid pump 18*b* is alternatingly driven with the output side closed for a service procedure cycle SP1, SP2 of approximately 40 seconds and then flushed with the printing fluid by stopping the second fluid pump 18*b* and opening the output side of the second fluid pump 18*b*.

In the illustrated service procedure cycles SP1 and SP2, the second fluid pump 18*b* is driven such that the pressure p2 decreases to a value of between approximately 0 mpsi to approximately 2000 mpsi, respectively, depending on the influx of printing fluid from the intermediate tank 12*c*. The PWM amplitude of the second fluid pump's 18 motor is at a value of approximately 9500 mV during the service procedure cycles SP1, SP2. After each service procedure cycle SP1, SP2 the outlet of the second fluid pump 18*b* is opened to flush out the printing fluid in the second fluid pump 18*b*. By performing the cycles SP1 SP2 of the service procedure repeatedly, the dry particle may be eventually flushed out from the second fluid pump 18*b*.

Any of the aforementioned alternatives or examples may be implemented in combination unless otherwise mentioned, and are not considered to exclude further additions to the respective systems. The examples discussed above are further considered illustrative and should not be construed as limiting. Rather, the scope of protection is to be determined by the scope of the appended claims.

The invention claimed is:

1. A printing fluid delivery system comprising:
a fluid pump having an inlet and an outlet;
a valve connected to the outlet of the fluid pump; and
a controller to initiate a service procedure based on a service condition of the fluid pump, the service procedure including closing the valve while the fluid pump is driven to increase the pressure at the outlet of the fluid pump and opening the valve based on a predefined relief condition to relieve the pressure at the outlet of the fluid pump.

2. The printing fluid delivery system of claim 1, wherein the predefined relief condition includes an elapsed time of driving the fluid pump or includes meeting a pressure threshold at the outlet of the fluid pump.

3. The printing fluid delivery system of claim 1, further comprising a bypass conduit, the bypass conduit selectively connecting the outlet and the inlet of the fluid pump, wherein the controller operates the fluid delivery system such that the printing fluid flows from the outlet to the inlet of the fluid pump through the bypass conduit when the pressure at the outlet of the fluid pump is greater than a pre-defined pressure threshold.

4. The printing fluid delivery system of claim 1, further comprising a pressure relief valve associated with a pre-defined pressure threshold and connecting the outlet and the inlet of the fluid pump such that the printing fluid flows from the outlet to the inlet of the fluid pump through the pressure relief valve when the valve is closed and the pressure difference between the outlet and the inlet is greater than the pre-defined pressure threshold.

5. The printing fluid delivery system of claim 1, wherein the fluid pump is a reciprocating positive displacement pump.

6. The printing fluid delivery system of claim 1, further comprising a sensor to monitor an operating condition of the fluid pump, wherein the controller closes the valve when the operating condition deviates from a target condition by a pre-defined deviation.

7. The printing fluid delivery system of claim 6, wherein the operating condition is a flow rate induced by the fluid pump, the pressure generated by the fluid pump at the outlet or the inlet, or the power consumption of the fluid pump.

8. The printing fluid delivery system of claim 1, wherein the controller closes the valve and drives the fluid pump to increase the pressure at the outlet of the fluid pump based on an elapsed time since the last service condition or based on a change of a fluid supply in the printing fluid delivery system.

9. The printing fluid delivery system of claim 8, comprising a second fluid pump having a second inlet and a second outlet, and further comprising a second valve connected to the second outlet of the second fluid pump, wherein the controller closes the second valve based on an operating condition of the second fluid pump while the second fluid pump is driven to increase the pressure at the second outlet of the second pump, and opens the second valve based on a predefined condition to relieve the pressure at the outlet of the fluid pump, and records the operating condition.

10. The printing fluid delivery system of claim 1, wherein the controller is to drive the fluid pump when the valve is closed to increase the pressure to a level sufficient to dislodge a dry particle impeding operation of the pump.

11. A printer comprising a printing fluid delivery system to move a printing fluid between a printing fluid supply and a printhead, the printing fluid delivery system comprising:

a fluid pump having an inlet and an outlet;

a valve connected to the outlet of the fluid pump; and a pressure relief valve associated with a pre-defined pressure threshold and connecting the outlet and the inlet of the fluid pump such that the printing fluid flows from the outlet to the inlet of the fluid pump through the pressure relief valve when the pressure difference between the outlet and the inlet is greater than the pre-defined pressure threshold, wherein the printer services the fluid pump based on a first service condition of the pump by closing the valve and driving the fluid pump to direct the printing fluid from the outlet of the fluid pump to the inlet of the fluid pump via the pressure relief valve.

12. The printer of claim 11, comprising a second fluid pump having a second inlet and a second outlet; a second valve connected to the second outlet of the second fluid pump; wherein the printer services the fluid pump based on a second service condition, the second service condition being different from the first service condition, by closing the second valve and driving the second fluid pump.

13. The printer of claim 11, further comprising an intermediate tank coupled to the printing fluid delivery system between the printing fluid supply and the printhead, wherein the controller controls the printing fluid delivery system to guide the printing fluid into the intermediate tank when the valve is opened.

14. A method to automatically service a fluid pump, the method comprising:

receiving a maintenance trigger based on a service condition of the pump;

reconfiguring a printing fluid delivery system associated with the fluid pump to increase fluid resistance at an output side of the fluid pump;

driving the fluid pump to increase a pressure at the outlet of the fluid pump, the pressure at the output of the fluid pump increased to a level sufficient to dislodge a dry particle impeding operation of the fluid pump; and reestablishing normal operation of the pump.

15. The method according to claim 14, wherein the fluid pump is connected to a pressure relief valve, the pressure relief valve connecting the outlet and an inlet of the fluid pump such that a printing fluid may flow from the outlet to the inlet of the fluid pump when the pressure at the outlet is greater than a pressure threshold, and the method comprises driving the fluid pump to increase the pressure at the outlet of the fluid pump to the pressure threshold.

16. The method according to claim 14, wherein the method further comprises stopping the fluid pump and relieving the increased pressure at the output of the pump before reestablishing normal operation of the pump.

* * * * *